UNITED STATES PATENT OFFICE.

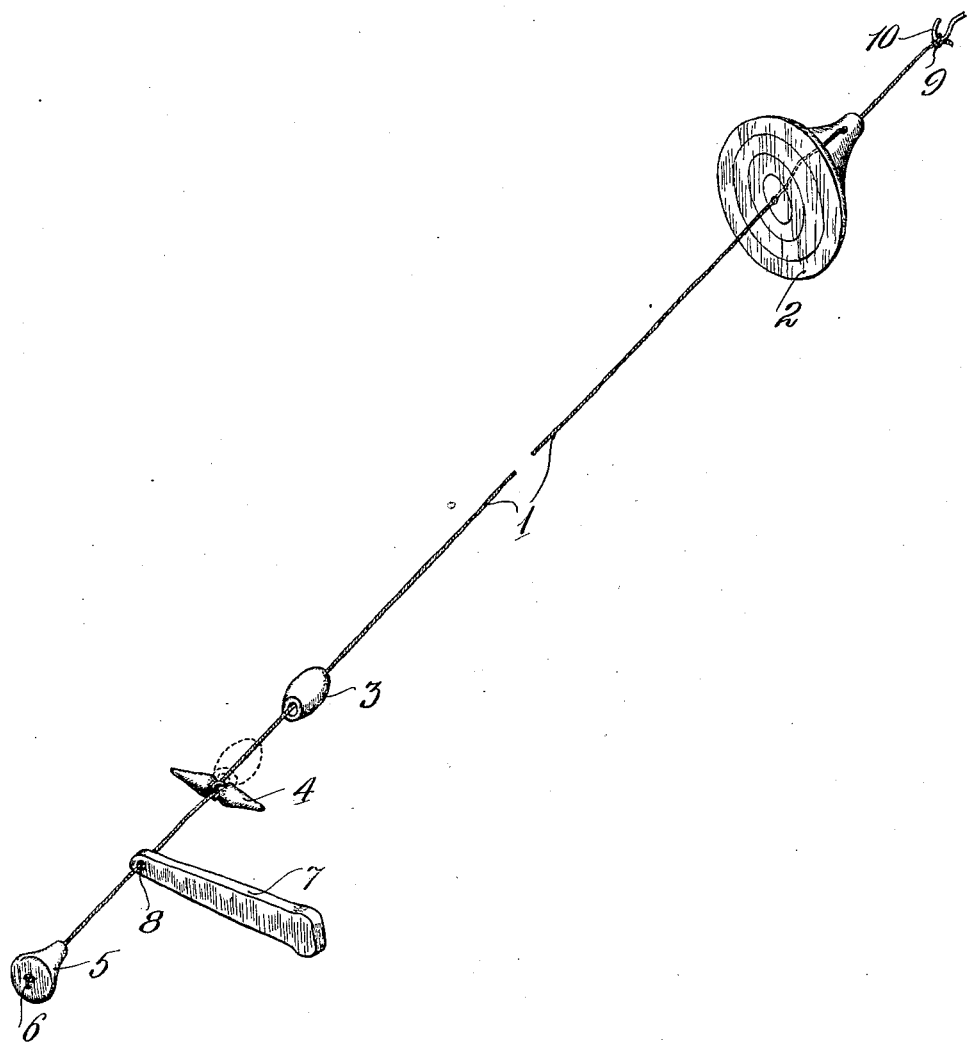

JAMES V. GEARY, OF LONGBEACH, CALIFORNIA.

TOY.

1,098,360.　　　　Specification of Letters Patent.　　Patented May 26, 1914.

Application filed December 15, 1913.　Serial No. 806,902.

*To all whom it may concern:*

Be it known that I, JAMES V. GEARY, a citizen of the United States, residing at Longbeach, in the county of Los Angeles and State of California, have invented a certain new and useful Improvement in Toys, of which the following is a specification.

My invention relates to an amusement device and particularly to a toy, an object of this invention being to provide an interesting and entertaining novelty for testing the skill of the player.

Other objects will appear from the following description in connection with the accompanying drawing, the figure on which is a perspective view of my invention.

Referring to the drawing, 1, designates a piece of twine of any desired length, on, at or near one of which may be fastened or attached in any fashion an object of any desired design, such as a tangent 2, as shown. A bead or captive missile 3 is loosely and slidably mounted on said twine 1, and normally rests against a cross piece or stop 4, as seen in dotted lines, tied by or otherwise attached to said twine near the other end thereof. On the other end of said twine 1, is a knob 5, held thereon in any suitable manner as by a knot 6.

7 indicates a handle having in one end thereof an aperture 8, through which the twine 1, passes, said handle being located between said knot 6 and said cross piece or stop 4. The term "handle" used herein and applied to the element 7 is intended to mean any object serving a similar purpose and arranged to be gripped by the hand or other member. It has been used for want of a better. That end of the twine 1, beyond the target 2, may be provided with a loop 9, as seen, for attachment to a hook 10, projecting from a stationary support.

In normal position for play, the bead or missile 3, lies in contact with the cross piece or stop 4. The player, grasping the knob 5, with one hand, tautens and stretches the twine 2 while with the other hand he grips the handle 7, holding the same preferably midway between the cross piece and the knob 5, and stationary during the intension of the twine with the first hand. By suddenly releasing the knob 5, it, by the tendency of the twine to resume its normal condition, is forcibly drawn against the handle 7, the resulting impact being transmitted to said cross piece or stop and in turn to said bead 3, which is thereby projected along the twine 1, at a speed proportional to the intension of the twine.

What I claim, is:—

1. A toy comprising a twine one end of which is adapted to be attached to a stationary support and the other end of which is provided with a knob, an object on and near the end of said twine, a bead on said twine, a stop for said bead, and a handle between said stop and knob.

2. A toy comprising a piece of twine, one end of which is adapted to be attached to a stationary support, and the other end of which is provided with a knob, a bead slidable on said twine, a stop for said bead near the free end of said twine, a handle loose on said twine and located between said stop and knob, and an object on said twine and near the attached end thereof arranged to be struck by said bead.

3. A toy comprising a piece of twine one end of which is adapted to be fastened to a stationary support, a knob on the other end of said twine, a bead loose on said twine, a handle loose on said twine and between said knob and bead, said handle serving to hold said knob when suddenly released and cause the impact to be transmitted to said bead to project the same along said twine.

In testimony whereof I have set my hand in the presence of two witnesses.

JAMES V. GEARY.

Witnesses:
　HENRY E. STORRS,
　ANTON GLOETZNER, Jr.

---

Copies of this patent may be obtained for five cents each, by addressing the "Commissioner of Patents, Washington, D. C."